United States Patent [19]
Hirata et al.

[11] Patent Number: 5,965,169
[45] Date of Patent: Oct. 12, 1999

[54] MOLD FOR MAKING SYNTHETIC RESIN MOLDED FOAM AND MOLDING PROCESS USING THE SAME

[75] Inventors: Yutaka Hirata; Teruo Iwai, both of Yokohama, Japan

[73] Assignee: Bridgestone Corporation, Tokyo, Japan

[21] Appl. No.: 08/943,236

[22] Filed: Oct. 3, 1997

[30] Foreign Application Priority Data

Oct. 24, 1996 [JP] Japan ..................................... 8-299580

[51] Int. Cl.⁶ .................................................. B29C 44/58
[52] U.S. Cl. ...................... 425/4 R; 425/812; 425/817 R
[58] Field of Search ............................... 425/4 R, 817 R, 425/812, 405.1

[56] References Cited

U.S. PATENT DOCUMENTS

| | | | |
|---|---|---|---|
| 4,501,541 | 2/1985 | Bethell et al. ............................ | 425/812 |
| 4,793,784 | 12/1988 | Belleville et al. ................... | 425/817 R |
| 4,793,793 | 12/1988 | Swenson et al. ..................... | 425/817 R |
| 4,973,235 | 11/1990 | Shoji ....................................... | 425/4 R |
| 5,007,815 | 4/1991 | Shoji ....................................... | 425/817 R |
| 5,011,394 | 4/1991 | Katagiri et al. ....................... | 425/817 R |
| 5,098,271 | 3/1992 | Yanagishita .......................... | 425/817 R |
| 5,723,152 | 3/1998 | Hirata et al. .......................... | 425/817 R |

FOREIGN PATENT DOCUMENTS

| | | | |
|---|---|---|---|
| 904518 | 7/1972 | Canada ................................ | 425/817 R |
| 56-159130 | 12/1981 | Japan ....................................... | 425/4 R |
| 1-263010 | 10/1989 | Japan ....................................... | 425/4 R |
| 2 225 978 | 6/1990 | United Kingdom ................... | 425/4 R |

*Primary Examiner*—Allan R. Kuhns
*Attorney, Agent, or Firm*—Sughrue, Mion, Zinn, Macpeak & Seas, PLLC

[57] ABSTRACT

A mold for foam molding a material for a synthetic resin molded foam, includes a mold main body having: a lower mold half; an upper mold half removably disposed on the lower mold half in such a manner as to cover an opening portion of the lower mold half for forming an enclosed space therebetween; and a middle mold part removably disposed in the enclosed space. In the mold main body, a plurality of spacers, spaced from each other in the circumferential direction, are provided between the middle mold part and the upper mold half; chambers, partitioned from each other by the spacers, are formed between the upper surface of the middle mold part and the lower surface of the lower mold half; and a cavity communicated to the chambers through gaps between the spacers and through a micro-gap formed between the middle mold part and the lower mold half, is formed between the middle mold part and the lower mold half, wherein a synthetic resin foam molding material is supplied into the cavity. The mold also includes a pressure adjusting device for depressurizing the interior of the chambers by evacuating air in the chambers. In this mold, when the air in the chambers is evacuated, air in the cavity is simultaneously evacuated through the gaps between the spacers and the micro-gap between the middle mold part and the lower mold half.

7 Claims, 1 Drawing Sheet

MOLD FOR MAKING SYNTHETIC RESIN MOLDED FOAM AND MOLDING PROCESS USING THE SAME

BACKGROUND OF THE INVENTION

The present invention relates to a mold used for foam molding a material for a synthetic resin molded foam, particularly, a synthetic resin molded foam having open cells such as a flexible polyurethane foam. This invention also relates to a process of foam molding a material for a synthetic resin molded foam using the mold.

Japanese Utility Model No. Sho 58-60418 discloses a process of producing an interior piece of equipment for a car such as a cushion pad by foam molding a polyurethane foam molding material, characterized in that the pressure in a cavity of a mold is adjusted.

In this process, a lower mold half and a middle mold part are set to form a molding cavity therebetween and an upper mold half is disposed to cover the lower mold half and the middle mold part, and a pressure adjusting chamber is formed between the middle mold part and the upper mold half and vent holes communicating the chamber to the cavity are formed in the middle mold part, whereby air in the cavity is evacuated to the chamber through the vent holes.

The process disclosed in the above document, however, has a disadvantage. When a pad having a relatively simple shape is foam molded, an air reservoir occurs in the molded pad near the parting portion, with a result that the percent of defective molded pads is very much increased. The prior art process presents another disadvantage. Since adjustment in pressure between the cavity and the chamber is performed only through the vent holes, the size and the number of the vent holes must be increased, and consequently the air is non-uniformly evacuated from the cavity to the chamber. This results in an uneven distribution of foamed cells of the product, and also requires a laborious work of cleaning burrs caught in the vent holes after molding.

Japanese Patent Publication No. Hei 7-102583 discloses a process for molding a material for a polyurethane foam, comprising the steps of depressurizing the interior of a cavity of a mold, and pouring in the cavity a polyurethane foam molding material obtained by mixing 100 parts by weight of a polyol component and 0.1–0.6 part by weight of water as a foaming component and foaming it thereby filling the cavity with the fluidized material. The process, however, has a disadvantage. In the step of depressurizing the interior of the cavity of the mold, the interior of the cavity is evacuated through a gap between PL (parting line) surfaces formed when at least two-divided mold portions of the mold are closed. Specifically, the neighborhoods of the PL surfaces of the mold are surrounded by a space portion and the interior of the cavity is evacuated through the gap between the PL surfaces by depressurizing the space portion. As a result, burrs tend to be formed in the gap between the PL surfaces.

SUMMARY OF THE INVENTION

Therefore, an object of the present invention is to provide a mold for foam molding a material for a synthetic resin molded foam suitable for an interior equipment for a car such as a cushion pad, at a high foaming rate, low density, high yield with the minimized burrs, and a high efficiency; and to provide a process of foam molding a material for the synthetic resin molded foam using the mold.

To achieve the above object, according to a first aspect of the present invention, there is provided a mold for foam molding a material for a synthetic resin molded foam, comprising:

a mold main body including: a lower mold half; an upper mold half removably disposed on the lower mold half in such a manner as to cover an opening portion of the lower mold half for forming an enclosed space therebetween; and a middle mold part removably disposed in the enclosed space; wherein a plurality of spacers, spaced from each other in the circumferential direction, are provided between the middle mold part and the upper mold half; a chamber is partitioned by the spacers, and is formed between the upper surface of the middle mold part and the lower surface of the upper mold half; and a cavity communicated to the chambers through gaps between the spacers and through a micro-gap formed between the middle mold part and the lower mold half, is formed between the middle mold part and the lower mold half, wherein a synthetic resin foam molding material is supplied into the cavity; and a pressure adjusting device for depressurizing the interior of the chamber by evacuating air in the chamber;

wherein when the air in the chamber is evacuated, air in the cavity is simultaneously evacuated through the gaps between the spacers and the micro-gap between the middle mold part and the lower mold half.

According to a second aspect of the present invention, there is provided a process for foam molding a material for a synthetic resin molded foam, using a mold comprising:

a mold main body including: a lower mold half; an upper mold half removably disposed on the lower mold half in such a manner as to cover an opening portion of the lower mold half for forming an enclosed space therebetween; and a middle mold part removably disposed in the enclosed space; wherein a plurality of spacers, spaced from each other in the circumferential direction, are provided between the middle mold part and the upper mold half; a chamber is partitioned by the spacers, and is formed between the upper surface of the middle mold part and the lower surface of the upper mold half; and a cavity communicates to the chamber through gaps between the spacers and through a micro-gap formed between the middle mold part and the lower mold half, is formed between the middle mold part and the lower mold half, wherein a synthetic resin foam molding material is supplied into the cavity; and a pressure adjusting device for depressurizing the interior of the chamber by evacuating air in the chamber;

the process comprising the steps of:

supplying a material for a synthetic resin molded foam into the cavity under atmospheric pressure;

closing the mold;

evacuating air in the chamber by operation of the pressure adjusting device, and simultaneously evacuating air in the cavity through the gaps between the spacers and through the micro-gap between the middle mold part and the lower mold half thereby depressurizing the interior of the cavity; and foam molding the material for the synthetic resin molded foam.

In the above-described mold and molding process, the synthetic resin molded foam is preferably a flexible polyurethane foam.

According to the mold and the molding process of the present invention, a material for a synthetic resin molded foam is poured in a cavity of a mold under atmospheric pressure; the interior of the cavity is depressurized; and the material is foam molded under a reduced pressure. This makes it possible to improve the foaming rate, to obtain a low density molded foam by supplying a minimum amount of the material into the cavity, and to reduce occurrence of burrs because the interior of the mold is in a low pressure. In particular, by the use of the above-described mold composed of the lower mold half, upper mold half, and middle mold part, it is possible to produce lower density molded foams such as cushion pads with various shapes at a high yield as compared with the conventional products, and also to significantly simplify the finishing and repairing steps because occurrence of burrs is reduced or eliminated. The mold and the molding process of present invention, therefore, can solve the disadvantages of the prior art disclosed in the above-described document, Japanese Utility Model No. Sho 58-60418, and in particular, they are suitable for foam molding a material for a synthetic resin molded foam having open cells such as a flexible polyurethane molded foam.

DETAILED DESCRIPTION OF THE PREFERRED EMBODIMENTS

A process for foam molding a material for a synthetic resin molded foam according to the present invention is suitably used for foam molding, particularly, a synthetic resin molded foam having open cells such as a flexible polyurethane molded foam.

One embodiment of a mold according to the present invention will be described with reference to the drawings.

Figure 1:
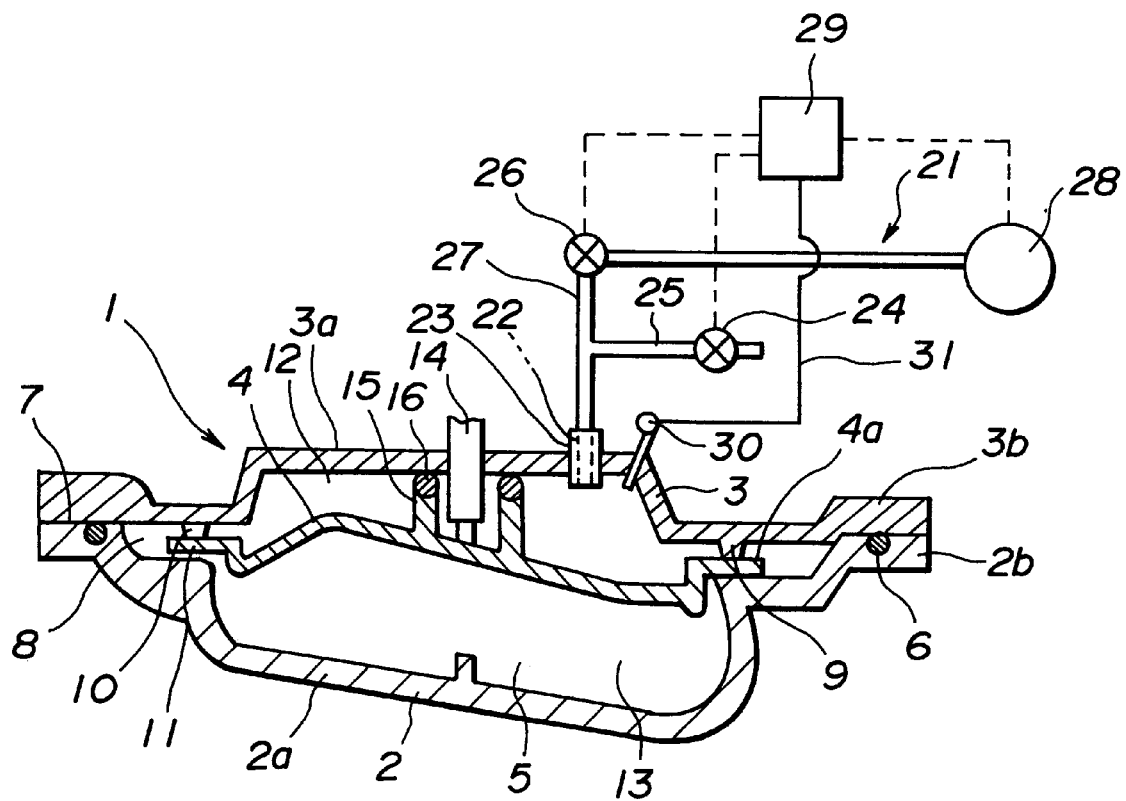
FIG. 1 is a schematic sectional side view showing one embodiment of a mold of the present invention.
Figure 2:
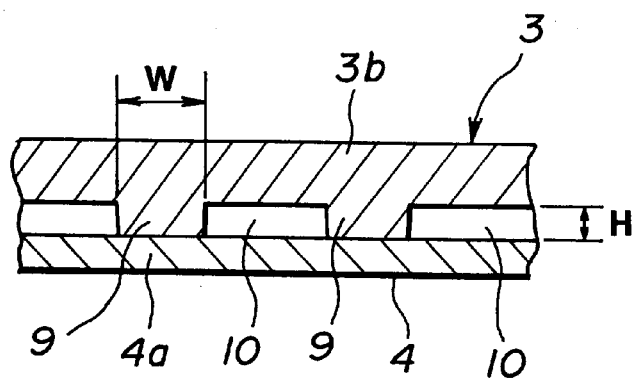
FIG. 2 is an enlarged sectional view of a spacer portion of the mold.

FIG. 1 is a view showing an embodiment of a mold according to the present invention. A mold main body 1 shown in FIG. 1 has a three-divided structure of a lower mold half 2, an upper mold half 3, and a middle mold part 4. The upper mold half 3 is removably disposed on the lower mold half 2 in such a manner as to cover an upper opening portion of the lower mold half 2. The middle mold part 4 is removably disposed in an enclosed space 5 formed between the lower mold half 2 and the upper mold half 3.

The lower mold half 2 is composed of a flat cylindrical body 2a with the bottom and a ring-like flange body 2b integrally projecting from the outer peripheral edge of the upper end of the flat cylindrical body 2a. The upper mold half 3 is composed of a flat cylindrical body 3a with the top and a ring-like flange body 3b integrally projecting from the outer peripheral edge of the lower end of the flat cylindrical body 3a. The outer peripheral edge portions of the flange bodies 2b and 3b are joined to each other through a ring-like packing 6, whereby the circulation of air between the flange bodies 2b and 3b is cut off.

A ring-like space 8 is formed between both the flange bodies 2b and 3b at a position inward from an abutment portion 7 of both the flange bodies 2b and 3b, and an outer peripheral portion 4a of the middle mold part 4 projects into the space 8.

A plurality of spacers 9, spaced from each other in the circumferential direction of the upper mold half, are provided projectingly from the inner peripheral edge side of the lower surface of the flange body 3b of the upper mold half 3 into the space 8. The tip surfaces (lower end surfaces) of the spacers 9 on the upper surface of the outer peripheral portion 4a of the middle mold part 4 projecting into the space 8. Air circulation gaps 10 are formed among the spacers 9 and the upper surface of the outer peripheral portion 4a of the middle mold part 4.

A micro-gap 11 is formed between the lower surface of the outer peripheral portion 4a of the middle mold part 4 and the upper surface of the flange body 2b of the lower mold half 2.

A chamber 12 is partitioned by the spacers 9 and is formed between the upper mold half 3 and the middle mold part 4, and a cavity 13 is formed between the lower mold half 2 and the middle mold part 4. The cavity 13 communicates with the chamber 12 through the air circulation gaps 10, the space 8, and the micro-gap 11.

The middle mold part 4 is vertically movable in the enclosed space 5 by an air cylinder 14, and thereby it can be held at a specific position. While not shown, the upper mold half 3 is fixed on a frame, and the lower mold half 2 is removably mounted on the upper mold half 3 by a suitable means such as an air lifter.

An isolation wall 15 projects from the upper surface of the middle mold part 4 in such a manner as to surround the air cylinder 14. A packing 16 is interposed between the upper end portion of the isolation wall 15 and the lower surface of the upper mold half 3 for cutting off circulation of air from the neighborhood of the air cylinder into the chamber 12.

Reference numeral 21 indicates a pressure adjusting device, which includes a connecting member 23 having an air circulation hole 22 communicated to the interior of the chamber 12. One-sided ends of both an exhaust pipe 25 provided with an exhaust valve 24 and an intake pipe 27 provided with an intake valve 26 are connected to the air circulation hole 22 of the connecting member 23. In addition, the other end of the intake pipe 27 is connected to a vacuum pump 28. Reference numeral 29 indicates a control unit which supplies a command for controlling the intake valve 26 and the exhaust valve 24 and also the vacuum pump 26. For example, on the basis of a command supplied from the control unit 29, the intake valve 26 is opened and the exhaust valve 24 is closed, and the vacuum pump 28 operates to suck air in the chamber 12; or the intake valve 26 is closed and the exhaust valve 24 is opened so that the atmospheric air flows in the chamber 12 through the exhaust valve 24. In this case, a pressure sensor 30 for detecting the pressure in the chamber 12 is connected to the control unit 29 through a lead 31. On the basis of a signal from the pressure sensor 30, the control unit 29 controls the operation of the vacuum pump 29 and the opening/closing of the exhaust valve 24 and the intake valve 26. Specifically, when on the basis of a command from the control unit 29, the intake valve 26 is opened and the exhaust valve 24 is closed and also the vacuum pump 28 is operated, the air in the chamber 12 is evacuated and thereby the interior of the chamber 12 is depressurized, and simultaneously the air in the cavity 13 communicated to the chamber 12 through the gaps 10, space 8 and the micro-gap 11 is also evacuated, and thereby the interior of the cavity 13 is depressurized. On the other hand, when the operation of the vacuum pump 28 is stopped, and the exhaust valve 24 is opened and the intake valve 26 is closed, the pressure of the interior of the chamber 12 is returned into the atmospheric pressure, and simultaneously the pressure of the interior of the cavity 13 in communication with the chamber 12 through the gaps 10, the space 8 and the micro-gap 11 is also returned to the atmospheric pressure.

For the spacer 9, the height H may be in a range of 1 to 100 mm, preferably, 1 to 10 mm; and the width W may be in a range of 10 to 1000 mm, preferably, 10 to 100 mm. The spacers 9 are preferably spaced at equal intervals such that the gaps 10 are equally spaced in the circumferential direction. The occupied ratio of the gaps 10 between the spacers 9 along the entire outer circumference is preferably in a range of 5 to 50%. When it is less than 10%, there possibly occurs an inconvenience in suction of air in the cavity 13.

The micro-gap 11 is in a range of 0.05 to 2 mm, preferably, 0.05 to 0.5 mm, more preferably, 0.05 to 0.2 mm.

Now, there will be described the process of preparing a product having a shape corresponding to that of the cavity 13 shown in FIG. 1 by foam molding a material for a flexible polyurethane molded foam using the above-described mold. First, the middle mold part 4 is set to the upper mold half 3 as shown in FIG. 1, and a material for a flexible polyurethane molded foam is poured in the lower mold half 2 in a state in which the lower mold half 2 is not set to the upper mold half 3. The lower mold half 2 is set to the upper mold half 3. Then, the intake valve 26 is opened and the exhaust valve 24 is closed, and also the vacuum pump 28 is operated. Thus, air in the chamber 12 is evacuated and the interior of the chamber 12 is depressurized, and also air in the cavity 13 in communication with the chamber 12 through the gaps 10, the space 8 and the micro-gap 11 is evacuated and the interior of the cavity 13 is depressurized. The vacuum degree in the chamber 12 is detected by the pressure sensor 30, and when it becomes a specific value, the operation of the vacuum pump 28 and the opening/closing of the exhaust valve 24 and the intake valve 26 are controlled on the basis of a command supplied from the control unit 29 for keeping the specific vacuum degree. Specifically, when the vacuum degree is higher than the specific value, the intake valve 26 is opened to further evacuate the air in the chamber 12, and when it is lower than the specific value, the exhaust valve 24 is opened to supply the air in the chamber 12.

The molding material is thus foam molded under the reduced pressure, and then the upper mold half 3 and the middle mold part 4 are removed from the lower mold half 2.

After the removal of the upper mold half 3 and the middle mold part 4 from the lower mold half 2, the molded product is released from the lower mold half 2.

The degree of reduction in pressure of the interior of the cavity 13 may be in a range of 10 to 500 mm Hg, preferably, 100 to 300 mm Hg on the basis of the atmospheric pressure. The degree of reduction in pressure exerts effect on the tendency toward the lower density of the molded foam.

According to the above mold, since the air in the cavity 13 can be uniformly evacuated from the entire area of the outer peripheral edge of the cavity 13 into the chamber 12 through the gaps 10, the space 8 and the micro-gap 11, a low density product can be positively, stably produced. In this case, even when the foaming pressure is applied to the lower surface of the middle mold part 4 upon foam molding, the middle mold part 4 is abutted on the lower end surfaces of the spacers 9 projecting from the flange body 3b of the upper mold half 3 and thereby the air in the cavity 13 is evacuated through the gaps 10 between the spacers 9. As a result, the air circulation gap 10 between the upper mold half 3 and the middle mold part 4 is not narrowed or closed, and is usually allowed to smoothly evacuate the air in the cavity 13.

Although in the embodiment the spacers 9 are provided on the lower surface of the flange body 3b of the upper mold half 3, they may be projectingly provided on the upper surface of the outer peripheral portion 4a of the middle mold part 4, and in some cases, a separate ring member from which spacers project may be provided.

EXAMPLE

The present invention will be more clearly understood with reference to the following example.

Example 1

A front cushion pad for a car was prepared by molding a material for a polyurethane molded foam using the mold shown in FIG. 1. A dry pump (trade name: KRX-3SS, produced by Orion Machinery Co., Ltd.) having a suction force of 235 L/min was used as the vacuum pump; a high vacuum solenoid valve (service pressure range: $10^{-8}$ Torr to 2 kgf/cm$^2$, CKD HVB type) was used as each of the exhaust valve and the intake valve; and a pressure transmitter (trade name: KH25, produced by Nagano Keiki Seisakusho, Ltd.) having a pressure range of $-0.5$ to $0.5$ kgf/cm$^2$ was used as the pressure sensor. For the spacers, the height was set at 10 mm; the width was set at 50 mm; the gap 10 was set at 50 mm; and the occupied ratio of the gaps 10 was set at 50%. The micro-gap 11 was set at about 0.1 mm. The capacity of the cavity of the mold was set at 28 l. As the material for a polyurethane molded foam, a high resilience polyurethane composition suitable for a cushion (produced by Bridgestone Corporation) was used. This molding material can be freely foamed without any mold into a foam having a density of 0.042 g/cm$^3$.

First, as a comparative example, 1500 g of the molding material was poured in the prior art mold under the atmospheric pressure, with the interior of the cavity being not depressurized, and then foam molded. As a result, a molded foam having a density of 0.050 g/cm$^3$ (overall) was obtained, and any molded foam having a density less than 0.050 g/cm$^3$ was not obtained. Also an air reservoir was observed on the back surface side of the cushion pad. For the molded foam having a density of 0.050 g/cm$^3$ or more, a number of hardened parting line flash were observed at a portion corresponding to the parting portion between the lower mold half and the upper mold half.

Next, according to the process of the present invention, 1320 g of the molding material was foam molded using the mold shown in FIG. 1. In this case, the interior of the cavity of the mold was evacuated such that the degree of reduction in pressure become 100 mmHg. As a result, a molded foam having a density of 0.045 g/cm$^3$ was obtained. In this molded foam, the occurrence of parting line flash was little observed.

Subsequently, 1180 g of the molding material was foam molded, with the degree of reduction in pressure of the interior of the cavity being set at 200 mmHg. As a result, a molded foam having a density of 0.040 g/cm$^3$ was obtained. In this molded foam, the occurrence of parting line flash was not observed at all.

While the embodiment of the present invention has been described using the specific example, such description is for illustrative purposes only, and it is to be understood that changes and variations may be made without departing from the spirit or scope of the following claims.

We claim:

1. A mold for foam molding a material for a synthetic resin molded foam, comprising:

a mold main body including: a lower mold half; an upper mold half removably disposed on said lower mold half in such a manner as to cover an opening portion of said lower mold half for forming an enclosed space therebetween; and a middle mold part removably disposed in said enclosed space; a plurality of spacers, spaced from each other in the circumferential direction, and provided to space said middle mold part from said upper mold half; a chamber is partitioned by said spacers and is formed between the upper surface of said middle mold part and the lower surface of said upper mold half; and a cavity is in communication with said chamber through gaps existing between said spacers and also through a micro-gap formed between said middle mold part and said lower mold half, said cavity being formed between said middle mold part and said lower mold half, whereby a synthetic resin foam molding material may be supplied into said cavity; and a pressure adjusting device for depressurizing the interior of said chamber by evacuating air in said by evacuating air in said chamber;

wherein when the air in said chamber is evacuated, air in said cavity is simultaneously evacuated through said gaps between said spacers and said micro-gap between said middle mold part and said lower mold half.

2. A mold according to claim 1, wherein said synthetic resin molded foam is a flexible polyurethane molded foam.

3. A mold according to claim 1, wherein said spacers have a height H in the range of 1–100 mm and a width in the range of 10 to 1000 mm.

4. A mold according to claim 1, wherein said spacers are positioned at equal intervals such that said gaps are equally spaced in the circumferential direction.

5. A mold according to claim 1, wherein an occupying ratio of said gaps between said spacers and an outer circumference formed by spacers is in the range of 5 to 50%.

6. A mold of claim 1, wherein said micro-gap is in the range of 0.05 to 2 mm.

7. A mold according to claim 1, wherein said spacers are formed on a lower surface of said upper mold half.

* * * * *